United States Patent
Hutton et al.

(10) Patent No.: US 9,583,218 B1
(45) Date of Patent: Feb. 28, 2017

(54) CONFIGURABLE REGISTER CIRCUITRY FOR ERROR DETECTION AND RECOVERY

(71) Applicant: Altera Corporation, San Jose, CA (US)

(72) Inventors: Michael D. Hutton, Mountain View, CA (US); Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 213 days.

(21) Appl. No.: 14/252,752

(22) Filed: Apr. 14, 2014

Related U.S. Application Data

(63) Continuation-in-part of application No. 14/164,047, filed on Jan. 24, 2014, now abandoned.

(51) Int. Cl.
*G11C 29/56* (2006.01)
*G06F 11/07* (2006.01)
(Continued)

(52) U.S. Cl.
CPC .... *G11C 29/56008* (2013.01); *G06F 9/30141* (2013.01); *G06F 11/0751* (2013.01); *G06F 11/10* (2013.01); *G06F 11/1451* (2013.01); *G06F 11/27* (2013.01); *G06F 17/5054* (2013.01); *G11C 11/4125* (2013.01); *H04L 1/004* (2013.01); *H04L 7/042* (2013.01);
(Continued)

(58) Field of Classification Search
CPC .......... G11C 29/56008; G11C 11/4125; G11C 2029/0411; G11C 2207/104; H01L 2924/00; G06F 11/0751; G06F 11/10; G06F 11/1451; G06F 11/27; G06F 17/5054; G06F 2217/70; G06F 9/30141; H04L 1/004; H04L 7/042
USPC ......... 714/E11.169, 54, 6.24, 704, 718, 719, 714/724, 725, 732, 733, 768; 326/9; 716/116
See application file for complete search history.

(56) References Cited

U.S. PATENT DOCUMENTS 3,916,379 A * 10/1975 Dulaney ................. H04L 1/004
714/704
5,425,035 A * 6/1995 Spence ................... G06F 11/27
714/732
(Continued)

OTHER PUBLICATIONS

Gosheblagh et al., Dynamic Partial based Single Event Upset (SEU) Injection Platform on FPGA, Aug. 2013, International Journal of Computer Applications, vol. 76—No. 3, pp. 19-24.*
(Continued)

*Primary Examiner* — John J Tabone, Jr.

(57) ABSTRACT

Integrated circuits such as application specific integrated circuits or programmable logic devices may include sequential elements such as configurable register circuitry. Such configurable register circuitry may operate as independent registers controlled by selectable clock signals or as a single register with error detection and error correction capabilities. For example, the configurable register circuitry when operated as single register with error detection and error correction circuitry may detect and correct runtime errors caused by manufacturing and environmental variations, thereby allowing an increase in the clock rate that controls the register. If desired, the configurable register circuitry may be configured to detect single event upsets, which may enable the implementation of safe finite state machines.

21 Claims, 13 Drawing Sheets

(51) Int. Cl.
*G06F 11/14* (2006.01)
*G06F 11/10* (2006.01)
*G06F 11/27* (2006.01)
*G06F 9/30* (2006.01)
*G06F 17/50* (2006.01)
*H04L 7/04* (2006.01)
*H04L 1/00* (2006.01)
*G11C 11/412* (2006.01)
*G11C 29/04* (2006.01)

(52) U.S. Cl.
CPC .. *G06F 2217/70* (2013.01); *G11C 2029/0411* (2013.01); *G11C 2207/104* (2013.01); *H01L 2924/00* (2013.01)

(56) References Cited

U.S. PATENT DOCUMENTS

| | | | |
|---|---|---|---|
| 7,818,705 B1 | 10/2010 | Hutton et al. | |
| 7,827,454 B2* | 11/2010 | Kurimoto | G01R 31/31858 324/535 |
| 8,146,028 B1* | 3/2012 | Lesea | G06F 17/5054 716/104 |
| 8,161,367 B2* | 4/2012 | Chandra | H03K 19/00392 326/9 |
| 2005/0069025 A1* | 3/2005 | Kimura | H04B 1/7075 375/152 |
| 2005/0216801 A1* | 9/2005 | Suzuki | H04L 7/0338 714/724 |
| 2007/0160174 A1* | 7/2007 | Yang | H04L 7/042 375/368 |
| 2008/0082900 A1* | 4/2008 | Yoon | G06F 11/1008 714/768 |
| 2008/0307277 A1* | 12/2008 | Tschanz | G06F 11/24 714/726 |
| 2009/0049349 A1* | 2/2009 | Takasugi | G11C 29/48 714/719 |
| 2013/0275817 A1* | 10/2013 | Bancel | G06F 11/0751 714/54 |
| 2015/0121132 A1* | 4/2015 | Tian | G06F 11/1451 714/6.24 |

OTHER PUBLICATIONS

Naseer et al., Single-Event Effects Characterization and Soft Error Mitigation in 90nm Commercial-Density SRAMs, Aug. 18-20, 2008, IASTED International Conference, pp. 153-158.*

Brant et al., "Safe Overclocking of Tightly Coupled CGRAs and Processor Arrats using Razor," Field-Programmable Custom Computing Machines (FCCM), 2013 IEEE 21st Annual International Symposium on, pp. 37,44, Apr. 28-30, 2013.

Ernst et al., "Razor: circuit-level correction of timing errors for low-power operation," Micro, IEEE , vol. 24, No. 6, pp. 10,20, Nov.-Dec. 2004.

Ernst et al., "Razor: a low-power pipeline based on circuit-level timing speculation," Microarchitecture, 2003. MICRO-36. Proceedings. 36th Annual IEEE/ACM International Symposium on, pp. 7,18, Dec. 3-5, 2003.

* cited by examiner

CONFIGURABLE REGISTER CIRCUITRY FOR ERROR DETECTION AND RECOVERY

This application is a continuation-in-part of application Ser. No. 14/164,047, filed Jan. 24, 2014, which is hereby incorporated by reference herein in its entirety.

BACKGROUND

This invention relates to integrated circuits and, more particularly, to configurable register circuitry with error detection and error recovery capabilities in integrated circuits.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which has led to performance increases. However, more recent technology nodes have seen a significant slow-down in the reduction of delays and thus to a slow-down in the performance increase.

Timing analysis is usually performed to determine the delay of paths between synchronous elements. The delay of the longest-delay path, which is sometimes also referred to as the critical path delay, determines the clock rate at which the synchronous elements in the integrated circuits are triggered. Timing analysis is required to account for the worst case scenarios and needs to take variability in combinational logic delays caused by manufacturing or environmental variations into account. In many cases, additional timing guard bands are required to ensure proper operation across manufacturing and environmental variations leading to overly pessimistic timing requirements and thus to slow clock rates.

Furthermore, some synchronous designs implemented in integrated circuits such as data paths in packet processing applications are tolerant of occasional timing faults caused by timing variability. Such timing variability tolerant designs are often able to handle the occasional timing fault, especially when the timing fault can be detected.

SUMMARY

In accordance with certain aspects of the invention, an integrated circuit such as a programmable logic integrated circuit may have first and second inputs and include a multiplexer, first and second registers, and a comparator.

The multiplexer may receive a predetermined configuration bit from a memory element and first and second signals from the first and second inputs. The multiplexer may further select between the first and second signals based on the predetermined configuration bit.

The first and second registers may be triggered based on a first and second clock signal, respectively. The first and second registers may further receive and store the first and second signals from the first and second input ports, respectively.

The comparator may receive the stored first and second signals from the first and second registers and generate a status signal based on a comparison of the stored first and second signals. For example, the comparator may generate the status signal as a result of a logic exclusive OR function of the stored first and second signals.

It is appreciated that the present invention can be implemented in numerous ways, such as a process, an apparatus, a system, a device, or instructions executed on a programmable processor. Several inventive embodiments are described below.

In certain embodiments, the above-mentioned integrated circuit may further include an additional multiplexer. The additional multiplexer may receive an additional predetermined configuration bit from an additional memory element, the status signal from the comparator and the stored selected signal from the second register. The additional multiplexer may select between the status signal and the stored selected signal based on the additional predetermined configuration bit.

If desired, the above-mentioned integrated circuit may further include a logic exclusive OR gate that receives the first clock signal and a second additional predetermined configuration bit from a second additional memory element. The logic exclusive OR gate may invert the first clock signal to generated the second clock signal based on the second additional predetermined configuration bit.

Further features of the invention, its nature and various advantages, will be more apparent from the accompanying drawings and the following detailed description of the preferred embodiments.

DETAILED DESCRIPTION

The present invention relates to integrated circuits such as programmable integrated circuits and more particularly to integrated circuits with configurable register circuitry.

As previously described, some synchronous designs implemented in integrated circuits such as data paths in packet processing applications are tolerant of occasional timing faults caused by timing variability. For example, a data packet dropped during the streaming of a video or during a phone conversation using a voice over internet protocol (VoIP) methodology may not be noticeable and thus may be acceptable. Such timing variability tolerant designs are often able to handle the occasional timing fault, especially when the timing fault can be detected.

It may therefore be desirable to provide register circuitry that may be configured to operate as conventional registers when the integrated circuit implements a timing variability intolerant design and as registers with error detection and error correction capabilities when the integrated circuit implements a timing variability tolerant design. Thus, a timing variability tolerant design may operate at a higher clock rate in an integrated circuit when the register circuitry is configured to operate as registers with error detection and error correction capabilities than when the register circuitry is configured to operate as conventional registers.

It will be recognized by one skilled in the art, that the present exemplary embodiments may be practiced without some or all of these specific details. In other instances, well-known operations have not been described in detail in order not to unnecessarily obscure the present embodiments.

Figure 1A:
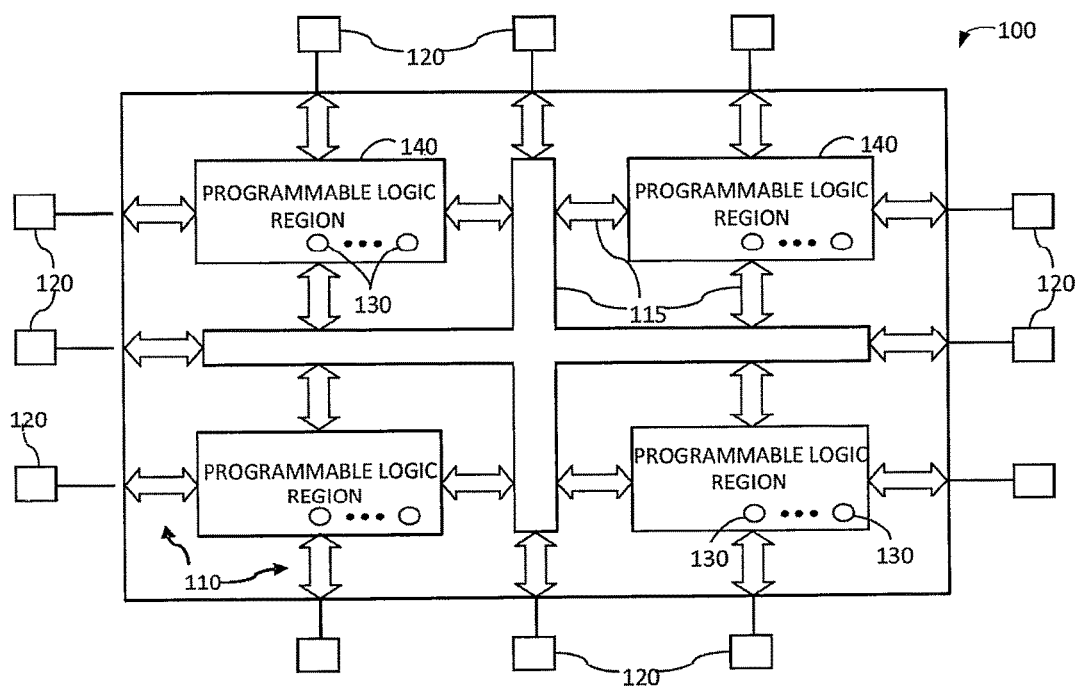
FIG. 1A is a diagram of an illustrative programmable integrated circuit with programmable logic regions in accordance with an embodiment.

An illustrative embodiment of an integrated circuit such as a programmable logic device 100 in accordance with the present invention is shown in FIG. 1.

Programmable logic device 100 has input/output circuitry 110 for driving signals off of device 100 and for receiving signals from other devices via input/output pins 120. Interconnection resources 115 such as global and local vertical and horizontal conductive lines and buses may be used to route signals on device 100.

Input/output circuitry 110 include conventional input/output circuitry, serial data transceiver circuitry, differential receiver and transmitter circuitry, or other circuitry used to connect one integrated circuit to another integrated circuit.

Interconnection resources 115 include conductive lines and programmable connections between respective conductive lines and are therefore sometimes referred to as programmable interconnects 115.

Programmable logic region 140 may include programmable components such as digital signal processing circuitry, storage circuitry, arithmetic circuitry, or other combinational and sequential logic circuitry such as configurable register circuitry. As an example, the configurable register circuitry may operate as a conventional register. Alternatively, the configurable register circuitry may operate as a register with error detection and error correction capabilities.

The programmable logic region 140 may be configured to perform a custom logic function. The programmable logic region 140 may also include specialized blocks that perform a given application and have limited configurability. For example, the programmable logic region 140 may include specialized blocks such as configurable storage blocks, configurable processing blocks, programmable phase-locked loop circuitry, programmable delay-locked loop circuitry, or other specialized blocks with limited configurability. The programmable interconnects 115 may also be considered to be a type of programmable logic region 140.

Programmable logic device 100 contains programmable memory elements 130. Memory elements 130 can be loaded with configuration data (also called programming data) using pins 120 and input/output circuitry 110. Once loaded, the memory elements each provide a corresponding static control signal that controls the operation of an associated logic component in programmable logic region 140. In a typical scenario, the outputs of the loaded memory elements 130 are applied to the gates of metal-oxide-semiconductor transistors in programmable logic region 140 to turn certain transistors on or off and thereby configure the logic in programmable logic region 140 and routing paths. Programmable logic circuit elements that may be controlled in this way include parts of multiplexers (e.g., multiplexers used for forming routing paths in programmable interconnects 115), look-up tables, logic arrays, AND, OR, NAND, and NOR logic gates, pass gates, etc.

Memory elements 130 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 130 are loaded with configuration data during programming, memory elements 130 are sometimes referred to as configuration memory, configuration RAM, or programmable memory elements.

The circuitry of device 100 may be organized using any suitable architecture. As an example, the logic of programmable logic device 100 may be organized in a series of rows and columns of larger programmable logic regions each of which contains multiple smaller logic regions. The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs), configurable logic blocks (CLBs), slice, half-slice, etc. Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) or logic clusters of regions of logic containing for example multiple logic elements or multiple ALMs.

During device programming, configuration data is loaded into device 100 that configures the programmable logic regions 140 so that their logic resources perform desired logic functions. For example, the configuration data may configure a portion of the configurable register circuitry to operate as a conventional register. If desired, the configuration data may configure some of the configurable register circuitry to operate as a register with error detection and error correction capabilities.

Figure 1B:
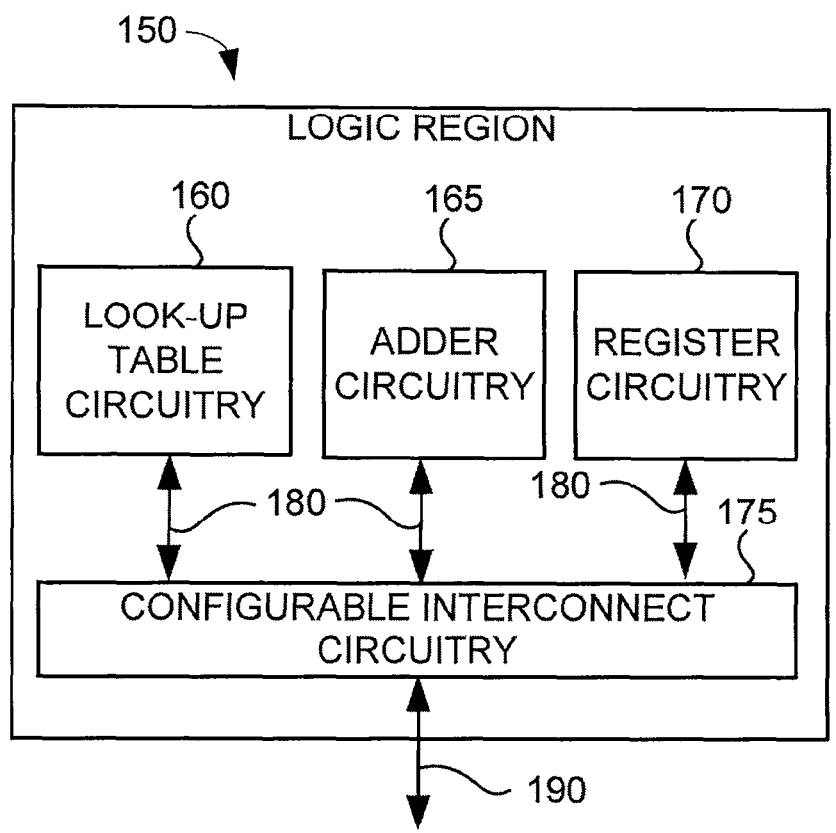
FIG. 1B is a diagram of an illustrative logic region in accordance with an embodiment.

FIG. 1B shows an illustrative diagram of a logic region 150. As shown in FIG. 1b, logic region 150 may include look-up table circuitry 160, adder circuitry 165, register circuitry 170, and configurable interconnect circuitry 175. Look-up table circuitry 160 may include one or more configurable look-up tables. For example, look-up table circuitry may include four three-input look-up tables which may be configured to implement two independent four-input look-up tables, one five-input look-up table, or two five-input look-up tables which share at least two inputs, etc.

Adder circuitry 165 may include one or more adders. Each of these adders may implement a half-adder, a full-adder, a carry-save adder, a ripple-carry adder, a carry-look ahead adder, or any other suitable adder circuitry.

Register circuitry 170 may include registers, latches, time-borrowing flip-flops (TBFF) or any other synchronous circuitry that is controlled by a clock signal. If desired, register circuitry 170 may contain several different synchronous elements such as registers and latches, or registers and time-borrowing flip-flops, just to name a few combinations.

Internal interconnection resources 180 such as conductive lines and busses may be used to send data from one component to another component or to broadcast data from one component to one or more other components. External interconnection resources 190 such as conductive lines and busses may be used to communicate with external components. External interconnection resources 190 may convey data signals between logic region 150 and external components. If desired, external interconnection resources may also convey control signals such as clock signals, asynchronous reset signals, etc.

Configurable interconnect circuitry 175 couples look-up table circuitry 160, adder circuitry 165, and register circuitry 170 with each other through internal interconnection resources 180 and to external components through external interconnection resources 190. Configurable interconnect circuitry 175 may include memory elements (e.g., memory elements 130 of FIG. 1A) which may be loaded with configuration data during device programming.

Figure 2:
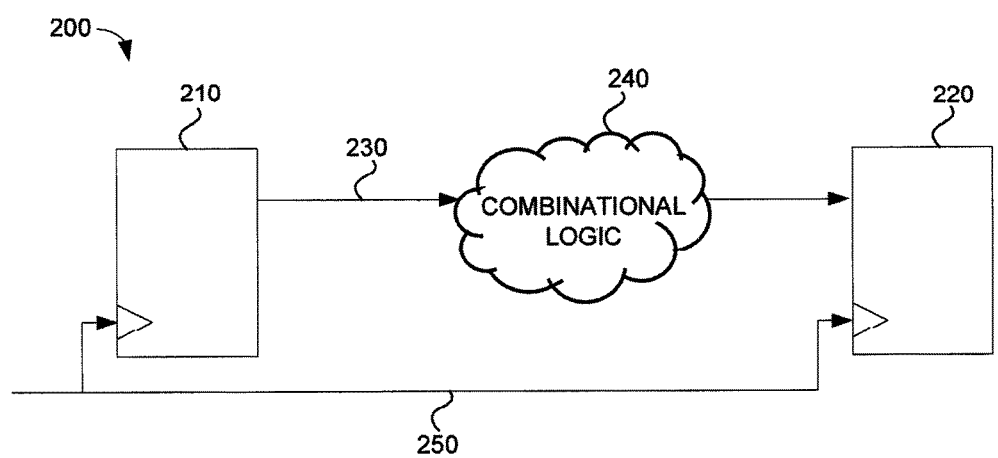
FIG. 2 is a diagram of an illustrative synchronous circuit in accordance with an embodiment.

FIG. 2 shows an illustrative diagram of a synchronous circuit. A synchronous circuit is characterized by one or more clock signals such as clock signal 250, synchronous storage elements such as registers 210 and 220 that are controlled by the clock signal, interconnects coupled between the synchronous elements (e.g., interconnect 230) to convey signals between synchronous elements, and combinational logic such as combinational logic 240 that may implement any desired logic function or combinations of logic functions.

As an example, register circuitry 170 of a first logic region 150 (see FIG. 1B) may include register 210 which may send a signal using interconnection resources 180, configurable interconnect circuitry 175, and external interconnection resources 190 to a second logic region 150. The second logic region may receive the signal and route the signal using configurable interconnect circuitry 175 and internal interconnection resources 180 to look-up table circuitry 160, which may implement the combinational logic 240. Logic region 150 may route the output of the combinational logic 240 using configurable interconnect circuitry 175 and internal interconnect resources 180 from the look-up table circuitry 160 to register circuitry 170 which may implement register 220.

Dedicated clock lines, sometimes also referred to as a clock tree, may distribute clock signals to all regions of an integrated circuit. A clock tree may have dedicated connections that reduce the skew between different branches of the tree in an attempt to achieve simultaneous arrival of a clock signal at all the different sequential elements that are controlled by that clock signal. The clock signal may trigger the sequential elements to store data signals available at their inputs. For example, a register may store a new data signal in response to receiving a rising edge of the clock signal at the register's clock input. Alternatively, a register may store a new data signal whenever a falling clock edge of the clock signal arrives at the register's clock input.

Consider the scenario where registers 210 and 220 are both rising clock edge triggered registers controlled by the same clock signal 250. In this scenario, a signal that is stored in register 210 at a rising clock edge and conveyed over interconnection 230 and through combinational logic 240 to register 220 is required to arrive at the data input of register 220 a given amount of time before the next rising edge of the clock signal reaches register 220. This given amount of time is sometimes also referred to as setup time (Tsu). The data signal at the data input 220 also needs to be stable for an additional amount of time after the rising edge of the clock signal has reached register 220. This additional amount of time is sometimes also referred to as hold time (Th). Setup time (Tsu) and hold time (Th) of a register may be defined for example in a data sheet or a library file. Setup time and hold time may constrain the clock rate of the clock signal.

Setup time and hold time may vary significantly depending on ambient temperature, supply voltage, and process technology, and these timing variations need to be taken into account on various different levels. For example, the combinational logic between registers may be optimized, register pipelining may reduce the delay between any two registers, or the clock rate may be adjusted. Any of these measures may be applied alone or in combination to guard band against timing variability, which may otherwise produce timing faults.

Figure 3A:
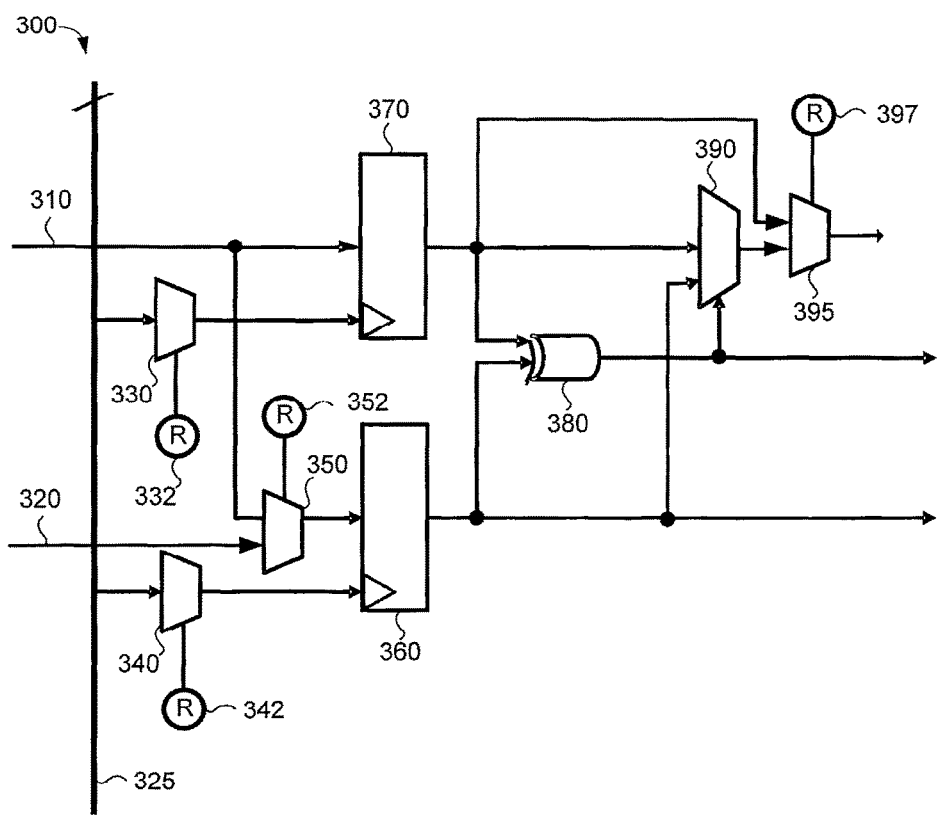
FIG. 3A is a diagram of illustrative register circuitry that is configurable as two independent registers or as one register with error detection and error recovery circuitry in accordance with an embodiment.

Some synchronous designs may be able to tolerate occasional timing faults caused by timing variability. FIG. 3A shows an embodiment of configurable register circuitry 300 that may operate as conventional registers for a timing variability intolerant design and as registers with error detection and error correction capabilities for a timing variability tolerant design. Thus, a timing variability tolerant design may operate at a higher clock rate when the register circuitry is configured to operate as registers with error detection and error correction capabilities than when the register circuitry is configured to operate as conventional registers.

As shown in FIG. 3A, configurable register circuitry 300 may include registers 360 and 370, multiplexer 390, logic exclusive OR gate 380, and configuration memory 332, 342, 352, and 397 that configure multiplexers 330, 340, 350, and 395 respectively. For example, the configurable register circuitry may be configured to operate as two independent registers. In this configuration, which is sometimes also referred to as "normal configuration", configuration memory 352 may configure multiplexer 350 to select the signal from wire 320. Thus, register 360 may store the signal conveyed by wire 320, while register 370 may store the signal conveyed by wire 310. Configurable memory element 397 may configure multiplexer 395 to select the signal arriving directly from register 370, and the output produced by logic exclusive OR gate 380 may be discarded in this configuration. Configuration memory 332 and 342 may configure multiplexers 330 and 340 to select any of the clock signals to control registers 370 and 360, respectively.

As another example, configurable register circuitry 300 may be configured to operate as one register with error detection and error correction capabilities. In this configuration, which is sometimes also referred to as "error-detecting configuration", configuration memory 352 may configure multiplexer 350 to select the signal conveyed by wire 310. Thus, both registers (i.e., registers 360 and 370) may store the same signal. Configuration memory 332 may configure multiplexer 330 to select a predetermined clock signal, and configuration memory 342 may configure multiplexer 340 to select the same predetermined clock signal delayed by a given duration.

Configuration memory 397 may configure multiplexer 395 to select the signal arriving from multiplexer 390, and multiplexer 390 may propagate the signal from register 370 for as long as registers 370 and 360 have the same value. In the event that registers 360 and 370 store different values, logic exclusive OR gate 380 may switch polarity and direct multiplexer 390 to select the signal from register 360.

Figure 3B:
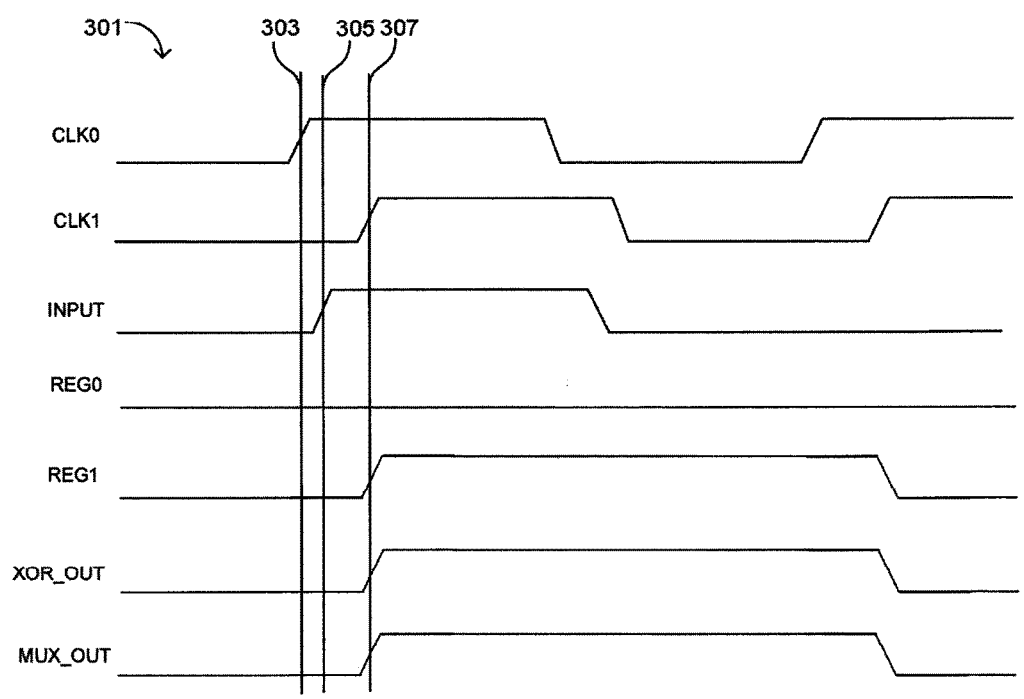
FIG. 3B is a diagram of an illustrative waveform showing the operation of the register circuitry of FIG. 3A in error detection and error recovery mode in accordance with an embodiment.

FIG. 3B is a diagram of an illustrative waveform showing the operation of the configurable register circuitry 300 of FIG. 3A in error detection and error recovery mode with CLK0 and CLK1 representing the clock signals selected by multiplexers 330 and 340, respectively. The signal INPUT may represent the signal conveyed over wire 310, REG0 and REG1 the signals at the outputs of registers 370 and 360, XOR_OUT the signal at the output of logic exclusive OR gate 380, and MUX_OUT the signal at the output of multiplexer 395.

As an example, consider the scenario in which timing variability causes the signal conveyed over wire 310 to arrive at time 305, while the clock signal CLK0 has a rising clock edge at time 303 which is before the transition of signal INPUT and the clock signal CLK1 has a rising clock edge at time 307 which is after the transition of signal INPUT. This implies that the signal conveyed over wire 310 arrives at register 370 later than the clock signal selected by multiplexer 330 and at register 360 before the clock signal selected by multiplexer 340.

In this scenario, register 360 may store a different signal than register 370 as illustrated by signals REG0 and REG1 in FIG. 3B. In other words, register 370 may store a faulty signal (i.e., an error occurred) while register 360 stores the correct signal. Logic exclusive OR gate 380 may detect the error and produce a corresponding error detection signal as illustrated by signal XOR_OUT at time 307. Logic exclusive OR gate 380 may also direct multiplexer 390 to select the signal from register 360 (i.e., the correct signal) for propagation to multiplexer 395 instead of selecting the signal from register 370 (i.e., the faulty signal) for propagation to multiplexer 395, thereby performing error correction as illustrated by signal MUX_OUT at time 307.

Figure 4A:
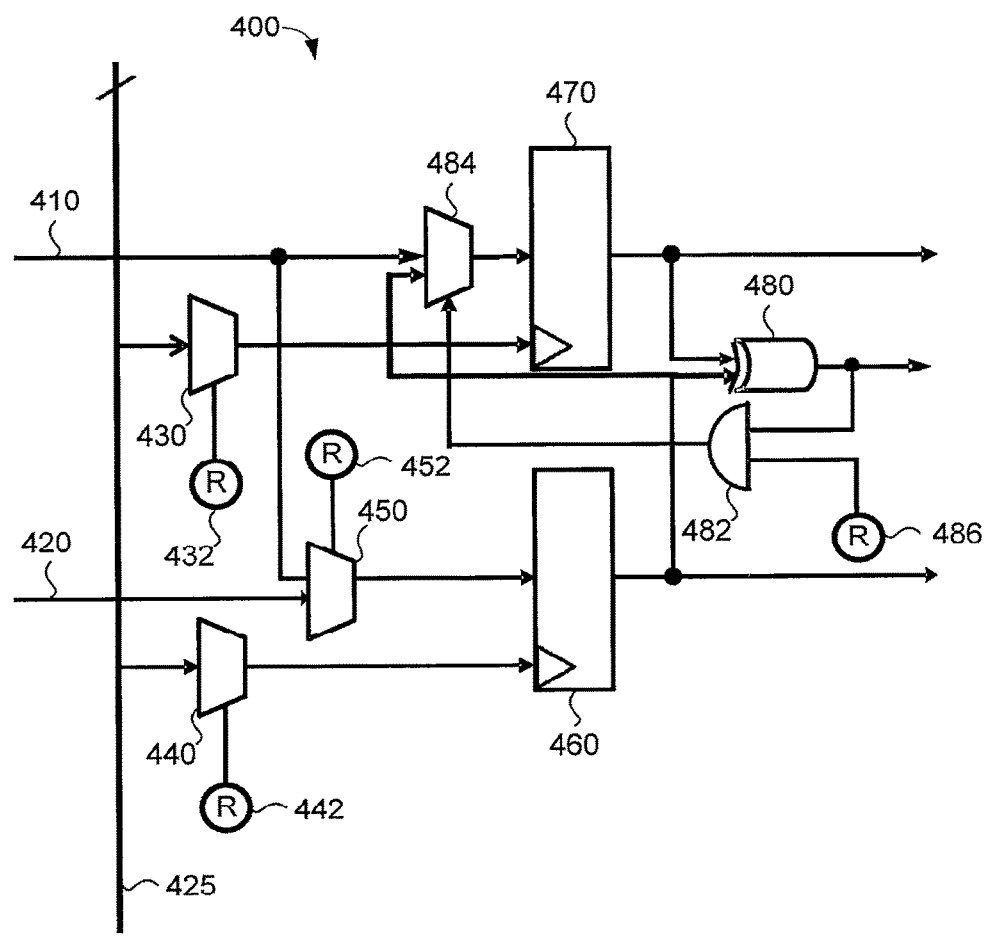
FIG. 4A is a diagram of illustrative register circuitry that is configurable as two independent registers or as one register with error detection and error recovery circuitry in the next clock cycle in accordance with an embodiment.

Configurable register circuitry 300 of FIG. 3A may store a faulty signal in register 370 and perform error correction at the output using multiplexer 390. If desired, the error correction may be performed such that the register stores the corrected signal at the next rising clock edge. FIG. 4A shows an embodiment of such configurable register circuitry 400 that, similar to configurable register circuitry 300 in FIG. 3A, may operate as conventional registers for a timing variability intolerant design and as registers with error detection and error correction capabilities for a timing variability tolerant design.

As shown in FIG. 4A, configurable register circuitry 400 may include registers 460 and 470, multiplexer 484, logic exclusive OR gate 480, and configuration memory 486, 432, 442, and 452 that configure logic AND gate 482 and multiplexers 430, 440, and 450 respectively.

As an example, configurable register circuitry 400 may be configured to operate as two independent registers. In this configuration, configuration memory 452 may configure multiplexer 450 to select the signal from wire 420. Thus, register 460 may store the signal conveyed by wire 420. Configurable memory element 486 may configure logic AND gate 482 to disable access to multiplexer 484. For example, configuration memory element 486 may store a logic "0" to disable access to multiplexer 484 and logic "1" to enable access to multiplexer 484. Thus, when access to multiplexer 484 is disabled, multiplexer 484 may select the signal from wire 410. The output produced by logic exclusive OR gate 480 may be discarded in this configuration. Configuration memory 432 and 442 may configure multiplexers 430 and 440 to select any of the clock signals 425 to control registers 470 and 460, respectively.

As another example, configurable register circuitry 400 may be configured to operate as one register with error detection and error correction capabilities. In this configuration, configuration memory 452 may configure multiplexer 450 to select the signal conveyed by wire 410, and multiplexer 484 may initially be configured to select the same signal conveyed by wire 410. Thus, both registers (i.e., registers 460 and 470) may store the same signal. Configuration memory 432 may configure multiplexer 430 to select a predetermined clock signal, and configuration memory 442 may configure multiplexer 440 to select the same predetermined clock signal delayed by a given duration.

Configuration memory 486 may configure logic AND gate 482 to enable access from logic exclusive OR gate 480 to multiplexer 484, and multiplexer 484 may propagate the signal from wire 410 for as long as the signals stored in registers 470 and 460 have the same value. In the event that registers 460 and 470 store signals that have different values, logic exclusive OR gate 480 may switch polarity, which may cause the output of logic AND gate 482 to switch polarity and thus direct multiplexer 484 to select the signal from register 460.

Figure 4B:
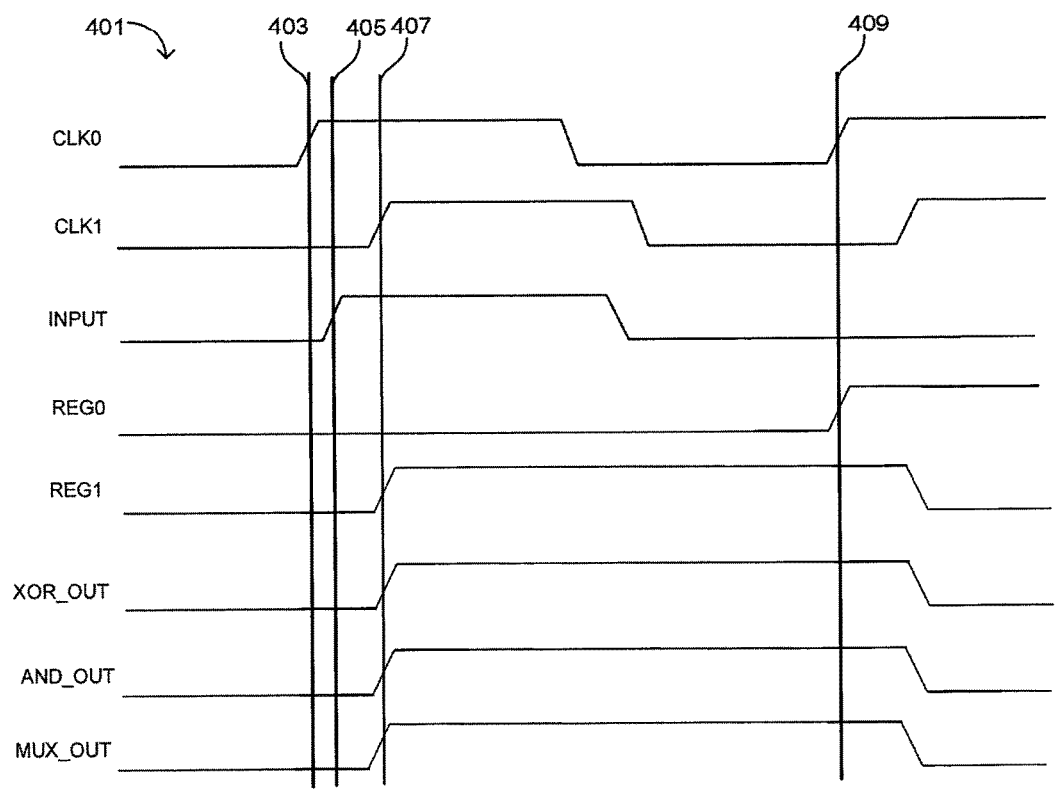
FIG. 4B is a diagram of an illustrative waveform showing the operation of the register circuitry of FIG. 4A in error detection and error recovery mode in accordance with an embodiment.

FIG. 4B is a diagram of an illustrative waveform showing the operation of the configurable register circuitry 400 of FIG. 4A in error detection and error recovery mode with CLK0 and CLK1 representing the clock signals selected by multiplexers 430 and 440, respectively. The signal INPUT may represent the signal conveyed over wire 410, REG0 and REG1 the signals at the outputs of registers 470 and 460, AND_OUT the signal at the output of logic AND gate 482, XOR_OUT the signal at the output of logic exclusive OR gate 480, and MUX_OUT the signal at the output of multiplexer 484.

As an example, consider the scenario in which timing variability causes the signal conveyed over wire 410 to arrive at time 405, while the clock signal CLK0 has a rising clock edge at time 403 which is before the transition of signal INPUT and the clock signal CLK1 has a rising clock edge at time 407 which is after the transition of signal INPUT. This implies that the signal conveyed over wire 410 arrives at register 470 later than the clock signal selected by multiplexer 430 and at register 460 before the clock signal selected by multiplexer 440. In this scenario, register 460 may store a different signal than register 470 as illustrated by signals REG1 and REG0, respectively. In other words, register 470 may store a faulty signal (i.e., an error occurred) while register 460 stores the correct signal. Logic exclusive OR gate 480 may detect the error and produce a corresponding error detection signal as illustrated by signal XOR_OUT. Configuration memory 486 may configure logic AND gate 482 to propagate the error detection signal from logic exclusive OR gate 480 to multiplexer 484 as illustrated by signal AND_OUT, which in response may select the signal from register 460 (i.e., the correct signal) for propagation to register 470 as illustrated by signal MUX_OUT, where the faulty signal may be corrected one clock cycle later.

Figure 5:
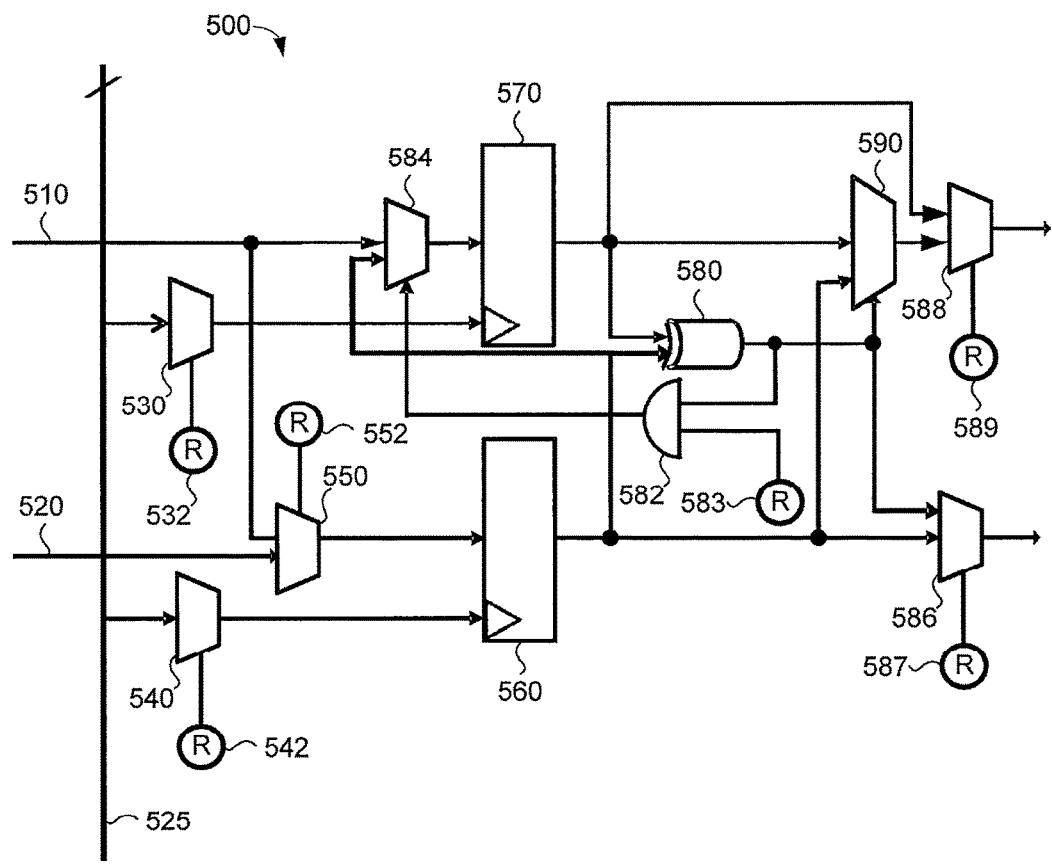
FIG. 5 is a diagram of illustrative register circuitry that is configurable as two independent registers or as one register with error detection and error recovery circuitry in either the current or the next clock cycle in accordance with an embodiment.

FIG. 5 shows another embodiment of configurable register circuitry 500 that, similar to configurable register circuitry 300 in FIG. 3A and configurable register circuitry 400 in FIG. 4A, may operate as two independent conventional registers for a timing variability intolerant design and as a single registers with error detection and error correction capabilities for a timing variability tolerant design.

As shown in FIG. 5, configurable register circuitry 500 may include registers 560 and 570, multiplexers 584 and 590, logic exclusive OR gate 580, and configuration memory 583, 532, 542, 552, 587, and 589 that configure logic AND gate 582 and multiplexers 530, 540, 550, 586, and 588 respectively.

As an example, configurable register circuitry 500 may be configured to operate as two independent registers. In this configuration, configuration memory 552 may configure multiplexer 550 to select the signal from wire 520. Thus, register 560 may store the signal conveyed by wire 520. Configurable memory element 586 may configure logic AND gate 582 to disable access to multiplexer 484. Thus, multiplexer 584 may select the signal from wire 510. Configurable memory element 589 may configure multiplexer 588 to select the signal arriving from register 570, and configurable memory element 587 may configure multiplexer 586 to select the signal arriving from register 560. Configuration memory 532 and 542 may configure multiplexers 530 and 540 to select any of the clock signals 525 to control registers 570 and 560, respectively.

As another example, configurable register circuitry 500 may be configured to operate as one register with error detection and error correction capabilities. In this configuration, configuration memory 552 may configure multiplexer 550 to select the signal conveyed by wire 510, and multiplexer 584 may initially be configured to select the same signal conveyed by wire 510. Thus, both registers (i.e., registers 560 and 570) may store the same signal.

Configuration memory 532 may configure multiplexer 530 to select a predetermined clock signal, and configuration memory 542 may configure multiplexer 540 to select the same predetermined clock signal delayed by a given duration. Configurable register circuitry 500 may be configured to provide error correction at the same clock cycle or at the next clock cycle. For example, configuration memory 589 may direct multiplexer 588 to select the input connected to register 570, configuration memory 583 may configure logic AND gate 582 to enable access from logic exclusive OR gate 580 to multiplexer 584, and multiplexer 584 may propagate the signal from wire 510 for as long as the signals stored in registers 570 and 560 have the same value. In the event that registers 560 and 570 store signals that have different values, logic exclusive OR gate 580 may switch polarity, which may cause the output of logic AND gate 582 to switch polarity and thus direct multiplexer 584 to select the signal from register 560, thereby performing error correction at the next clock cycle.

If desired, configuration memory 589 may direct multiplexer 588 to select the input connected to multiplexer 590, configuration memory 583 may configure logic AND gate 582 to disable access from logic exclusive OR gate 580 to multiplexer 584, and thus multiplexer 584 may propagate the signal from wire 510 to register 570. In the event that registers 560 and 570 store signals that have different values, logic exclusive OR gate 580 may switch polarity, which may direct multiplexer 590 to select the signal from register 560, thereby performing error correction at the same clock cycle.

As an example, consider the scenario in which timing variability causes the signal conveyed over wire 510 to arrive at register 570 later than the clock signal selected by multiplexer 530 and at register 560 before the clock signal selected by multiplexer 540. In this scenario, register 560 may store a different signal than register 570. In other words, register 570 may store a faulty signal (i.e., an error occurred) while register 560 stores the correct signal. Logic exclusive OR gate 580 may detect the error and produce a corresponding error detection signal. Configuration memory 587 may direct multiplexer 586 to propagate the error detection signal to downstream circuitry.

Configuration memory 583 may configure logic AND gate 582 to propagate the error detection signal from logic exclusive OR gate 580 to multiplexer 584, which in response may select the signal from register 560 (i.e., the correct signal) for propagation to register 570, where the faulty signal may be corrected one clock cycle later.

If desired, configuration memory 589 may direct multiplexer 588 to select the input connected to multiplexer 590, and multiplexer 590 may select the input connected to register 560 based on the error detection signal produced by logic exclusive OR gate 580, thereby correcting the faulty signal in the same clock cycle.

Configurable register circuitry 300, 400, and 500 may be configured to provide protection against single event upsets when operated in error detection and error correction mode. In this configuration, registers 360 and 370 in FIG. 3A are triggered by the same clock signal, registers 460 and 470 in FIG. 4A are triggered by the same clock signal, and registers 560 and 570 in FIG. 5 are triggered by the same clock signal. In other words, configuration memory 332 and 342 direct multiplexers 330 and 340 to select the same clock signal, configuration memory 432 and 442 direct multiplexers 430 and 440 to select the same clock signal, and configuration memory 532 and 542 direct multiplexers 530 and 540 to select the same clock signal.

Figure 6:
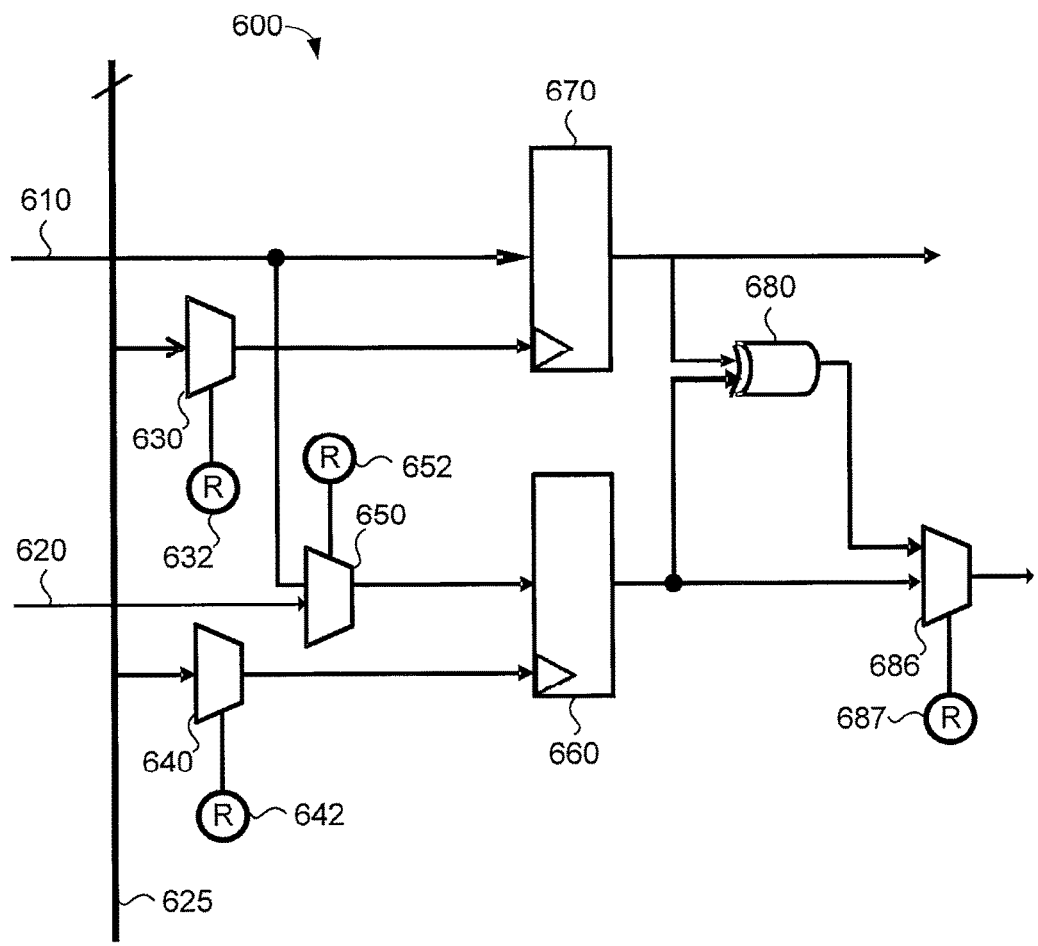
FIG. 6 is a diagram of illustrative register circuitry that is configurable as two independent registers or as one register with error detection circuitry in case of single event upsets in accordance with an embodiment.

FIG. 6 shows an embodiment of configurable register circuitry 600 that may be configured to operate as two independent registers, as a single register with detection of single event upsets, or as a single register with detection of timing faults caused by timing variability.

As shown in FIG. 6, configurable register circuitry 600 may include registers 660 and 670, logic exclusive OR gate 680, and configuration memory 632, 642, 652, and 687 that configure multiplexers 630, 640, 650, and 686 respectively. For example, the configurable register circuitry may be configured to operate as two independent registers. In this configuration, configuration memory 652 may configure multiplexer 650 to select the signal from wire 620. Thus, register 660 may store the signal conveyed by wire 620, while register 670 may store the signal conveyed by wire 610. Configurable memory element 687 may configure multiplexer 686 to select the signal arriving directly from register 660, and configuration memory 632 and 642 may configure multiplexers 630 and 640 to select any of the clock signals 625 to control registers 670 and 660, respectively.

As another example, configurable register circuitry 600 may be configured to operate as one register with error detection capabilities. In this configuration, configuration memory 652 may configure multiplexer 650 to select the signal conveyed by wire 610. Thus, both registers (i.e., registers 660 and 670) may store the same signal.

In the event that registers 660 and 670 store signals with different values, logic exclusive OR gate 680 may indicate that an error has occurred. Configuration memory 687 may configure multiplexer 686 to select the signal arriving from logic exclusive OR gate 680 and provide the selected signal as the error detection signal at an output of configurable register circuitry 600.

When configurable register circuitry 600 is configured to detect errors caused by timing variability, configuration memory 632 may configure multiplexer 630 to select a predetermined clock signal, and configuration memory 642 may configure multiplexer 640 to select the same predetermined clock signal delayed by a given duration.

As an example, consider the scenario in which timing variability causes the signal conveyed over wire 610 to arrive at register 670 later than the clock signal selected by multiplexer 630 and at register 660 before the clock signal selected by multiplexer 640. In this scenario, register 660 may store a different signal than register 670. In other words, register 670 may store a faulty signal (i.e., an error occurred) while register 660 stores the correct signal. Logic exclusive OR gate 680 may detect the error and produce a corresponding error detection signal, which is propagated to downstream logic by multiplexer 686.

When configurable register circuitry 600 is configured to detect errors caused by single-event upsets, configuration memory 632 may configure multiplexer 630 to select a predetermined clock signal, and configuration memory 642 may configure multiplexer 640 to select the same predetermined clock signal (i.e., both registers 660 and 670 store the same signal based on the same clock signal).

As an example, consider the scenario in which an ion strike causes the signal stored in register 670 to change polarity. In this scenario, register 660 may store a different signal than register 670. In other words, register 670 may store a faulty signal (i.e., an error occurred) while register 660 stores the correct signal. Logic exclusive OR gate 680 may detect the error and produce a corresponding error detection signal, which is propagated to downstream logic by multiplexer 686.

For example, error handling circuitry may receive the error signal from configurable register circuitry 600 and initiate error handling measures according to a predefined protocol. As an example, consider the implementation of a finite state machine (FSM), which uses configurable register circuitry 600 for implementing state registers. If desired, error handling circuitry may receive error detection signals from the configurable register circuitry that implements the state registers. The error handling circuitry may perform a state transition of the finite state machine from the faulty state to a safe state (e.g., the initial state) whenever an error is detected.

The implementation of a circuit design in an integrated circuit such as programmable logic device 100 of FIG. 1 may include instantiations of individual registers, registers with error detection capabilities, and registers with error detection and error correction capabilities. CAD tools (e.g., logic synthesis, placement, and routing tools) may map the circuit design onto the integrated circuit and select the appropriate configurable register circuitry and provide the corresponding configuration.

If desired, assignments may determine the configuration of a given configurable register circuit when implementing a circuit design using an integrated circuit (e.g., programmable logic device 100 of FIG. 1) with configurable register circuitry. For example, an assignment may configure a configurable register circuit to operate as multiple independent registers, as a single register with error detection capabilities, or a single register with error detection and error correction capabilities.

Those assignments can be provided for individual configurable register circuits, portions of the circuit design, or for the entire circuit design. For example, the assignments may be provided with the design specification, the RTL description of the circuit design (e.g., as a pragma or as an assertion), in an assignment file, or through user input (e.g., using a design and assignment entry tools), to name a few.

In certain embodiments, a given configurable register circuit may have more than one assignment, which may be in conflict with each other e.g., an assignment received with the design specification for a given configurable register circuit may conflict with the assignment received with the RTL description of the circuit design and with another assignment received with the assignment file. In this scenario, a predetermined priority of assignments, which may be defined explicitly or resolved implicitly by CAD tools that implement the circuit design on the integrated circuit, may determine which of the conflicting assignments is selected.

For example, the assignment from the user or an assignment file may override the assignments received from other sources, and an assignment received with the RTL description may override an assignment received with the design specification.

The assignments may target the entire circuit design or portions of the circuit design. For example, some assignments may be defined globally and thus be applicable to the entire circuit design. Other assignments may be assigned locally and thus be applicable only to the corresponding portions of the circuit design. Consider the scenario in which the circuit design is organized hierarchically. In this scenario, every hierarchical instance may include different assignments. In other words, multiple different assignments may target the same portion of the circuit design, and priorities may be defined explicitly or resolved implicitly by CAD tools.

For example, an assignment defined at a higher level of the circuit design hierarchy may override an assignment at a lower level. Alternatively, an assignment defined at a lower level of the circuit design hierarchy may override an assignment at a higher level, or individual levels of the circuit design hierarchy may be given priority over other levels of circuit design hierarchy.

Assignments included in design specification or RTL description may be conveyed to CAD tools in the form of variables, parameters, compiler directives, macros, pragmas, or assertions, just to name a few. CAD tools may use an assignment file, which may include a portion or all of the assignments. Such an assignment file may be included with design specification or RTL description. In some scenarios, a portion or all of the assignments may be embedded in the circuit design. Alternatively, the assignments may have been defined using design and assignment entry tools.

As previously described, configuring configurable register circuitry to operate as a single register with detection of timing faults caused by timing variability requires the selection of a predetermined clock signal for a first register and the selection of the same predetermined clock signal delayed by given duration for a second register.

Figure 7A:
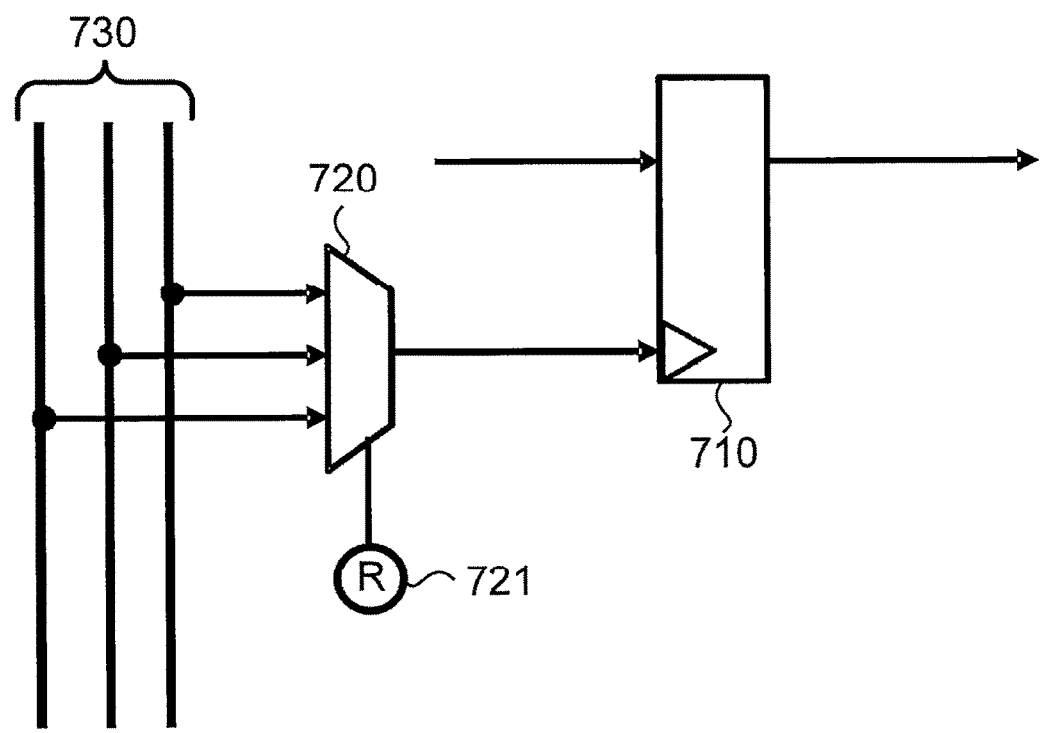
FIG. 7A is a diagram of illustrative clock selection circuitry in accordance with an embodiment.

FIG. 7A shows an embodiment of a clock selection circuit which may be configured to select one of the clock signals 730 (e.g., clock signals 325, 425, 525, or 625 of FIGS. 3 to 6, respectively) to control register 710 (e.g., registers 360, 460, 560, or 660 of FIGS. 3 to 6, respectively). As shown, configuration memory 721 may choose one of the clock signals 730 at the inputs of multiplexer 720 for propagation to register 710.

Figure 7B:
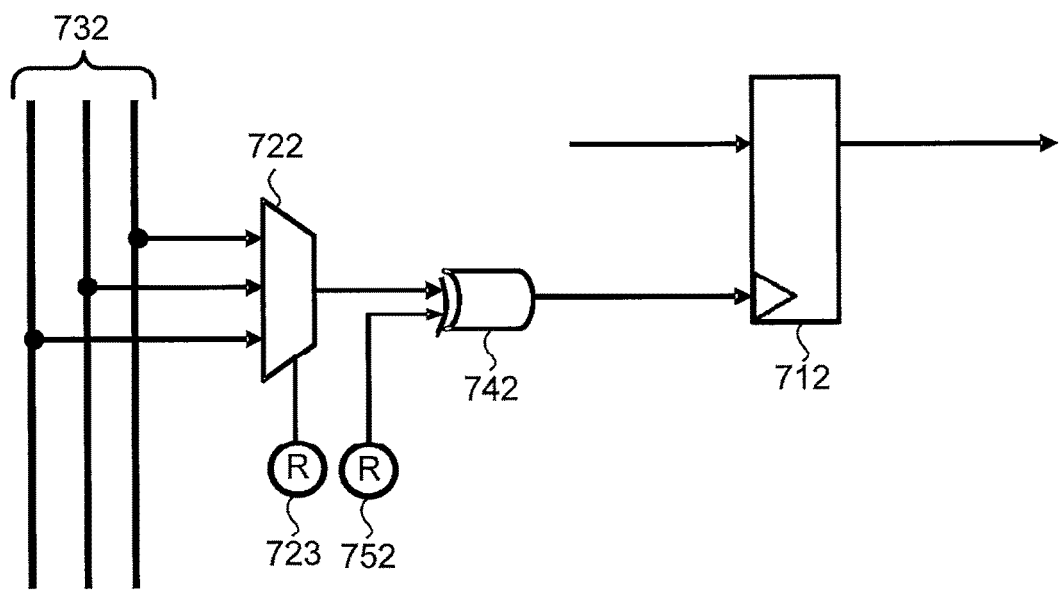
FIG. 7B is a diagram of illustrative clock selection circuitry with configurable clock signal inversion circuitry in accordance with an embodiment.

Another embodiment of a clock selection circuit is shown in FIG. 7B. As shown, configuration memory 723 may direct multiplexer 722 to select one of the clock signals 732. Logic exclusive OR gate 742 may either propagate or invert the selected clock signal based on configuration memory 752, thereby controlling register 712 with the selected clock signal or the selected clock signal delayed by half a clock cycle.

Figure 7C:
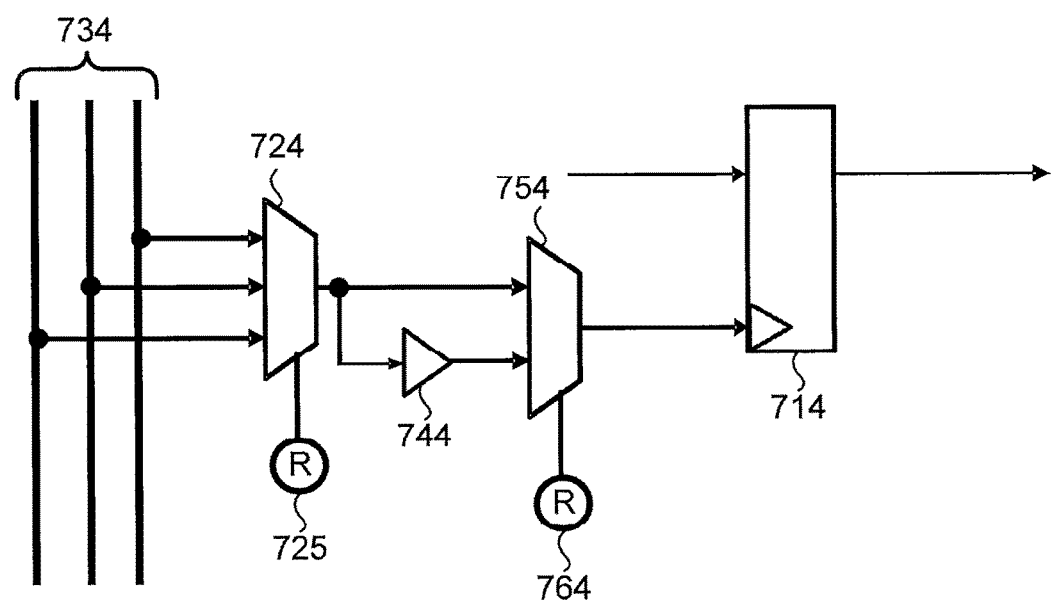
FIG. 7C is a diagram of illustrative clock selection circuitry with configurable clock signal delay circuitry in accordance with an embodiment.

Another embodiment of a clock selection circuit is shown in FIG. 7C. As shown, configuration memory 725 may direct multiplexer 724 to select one of the clock signals 734. The selected clock signal may be delayed by a given duration by delay element 744, and configuration memory 764 may direct multiplexer 754 to select between the selected clock signal from multiplexer 724 and the delayed clock signal from delay element 744 to control register 714.

The clock selection circuits shown in FIGS. 7A, 7B, and 7C are merely illustrative and are not intended to limit the scope of the invention. If desired, the clock selection circuit may include multiple delay elements with different delays from which a multiplexer may select. Delay circuits may be arranged in series or in parallel, delay circuits may be combined with logic exclusive OR gates, etc.

Figure 8:
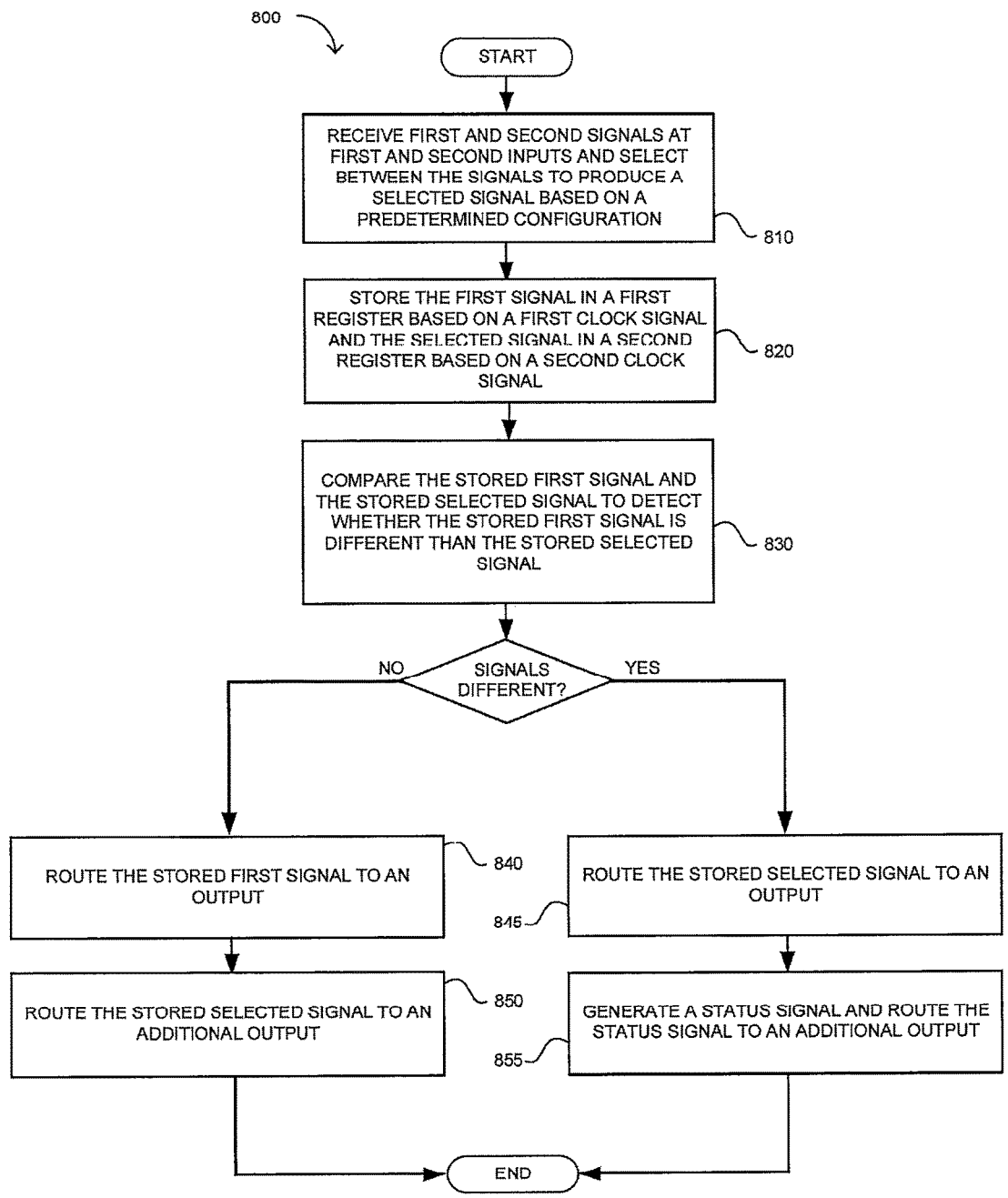
FIG. 8 is a flow chart showing illustrative steps for operating configurable register circuitry in error detection and recovery mode in accordance with an embodiment.

FIG. 8 is a flow chart showing illustrative steps for operating configurable register circuitry such as configurable register circuitry 500 of FIG. 5 in error detection and recovery mode in accordance with an embodiment. During step 810, the configurable register circuitry may receive first and second signals at first and second inputs such as signals conveyed over wires 510 and 520, respectively. The configurable register circuitry may select between the signals to produce a selected signal based on a predetermined configuration. For example, configuration memory 552 may direct multiplexer 550 to select the signal received on wire 510.

During step 820, a first register (e.g., register 570 of FIG. 5) in configurable register circuitry may store the first signal based on a first clock signal, and a second register (e.g., register 560 of FIG. 5) in configurable register circuitry may store the selected signal based on a second clock signal. For example, the second clock signal may be the first clock signal delayed by a predetermined duration.

During step 830, a comparator (e.g., logic exclusive OR gate 580 of FIG. 5) in configurable register circuitry may compare the stored first signal and the stored selected signal to detect whether the stored first signal is different than the stored selected signal. A difference in the two signals may indicate the detection of an error.

In response to detecting that the stored first signal and the stored selected signal have different values, the configurable register circuitry may route the stored selected signal to an output during step 845, thereby providing an error corrected signal at the output. For example, configuration memory 589 may select the input driven by multiplexer 588 which in turn may select the input driven by register 560 as directed by the logic exclusive OR gate 580. During step 855, the configurable register circuitry may generate a status signal and route the status signal to an additional output, thereby providing a signal indicating that an error was detected. For example, configuration memory 587 may direct multiplexer 586 to select the input driven by logic exclusive OR gate 580.

In response to detecting that the stored first signal and the stored selected signal have the same value, the configurable register circuitry may route the stored first signal from the first register to an output during step 840. During step 850, the configurable register circuitry may route the stored selected signal to an additional output.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The integrated circuit described herein may be part of a data processing system that includes one or more of the following components; a processor; memory; I/O circuitry; and peripheral devices. The integrated circuit can be used in a wide variety of applications, such as computer networking, data networking, instrumentation, video processing, digital signal processing, or any suitable other application where the advantage of using high-speed serial interface circuitry is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. An integrated circuit, comprising:
   a first memory element that produces a first configuration bit;
   a second memory element that produces a second configuration bit;
   a first multiplexer that receives the first configuration bit from the first memory element and first and second signals from first and second inputs, wherein the first multiplexer selects between the first and second signals based on the first configuration bit;
   a second multiplexer that receives the second configuration bit, a first clock signal, and a delayed first clock signal, wherein the second multiplexer selects between the first clock signal and the delayed first clock signal to generate a second clock signal based on the second configuration bit;
   a first register triggered based on the first clock signal, wherein the first register receives and stores the first signal from the first input;
   a second register triggered based on the second clock signal, wherein the second register receives and stores a selected one of the first and second signals from the first multiplexer; and
   a comparator that receives the stored first signal from the first register and the stored selected one of the first and second signals from the second register, the comparator generating a status signal based on a comparison of the stored first signal and the stored selected one of the first and second signals.

2. The integrated circuit of claim 1, wherein the comparator further comprises:
   a logic exclusive OR gate that receives the stored first signal from the first register and the stored selected one of the first and second signals from the second register.

3. The integrated circuit of claim 1, further comprising:
a third memory element that produces a third configuration bit; and
a third multiplexer that receives the third configuration bit from the third memory element, the status signal from the comparator and the stored selected one of the first and second signals from the second register, and wherein the third multiplexer selects between the status signal and the stored selected one of the first and second signals based on the third configuration bit.

4. The integrated circuit of claim 1, further comprising:
a third memory element that produces a third configuration bit; and
a logic exclusive OR gate that receives the first clock signal and the third configuration bit from the third memory element, and wherein the logic exclusive OR gate is operable to invert the first clock signal to generate the second clock signal based on the third configuration bit.

5. The integrated circuit of claim 1, further comprising:
a third multiplexer that receives the status signal from the comparator, the stored first signal from the first register, and the stored selected one of the first and second signals from the second register, and wherein the third multiplexer selects between the stored first signal and the stored selected one of the first and second signals based on the status signal to produce a third multiplexer output signal.

6. The integrated circuit of claim 5, further comprising:
a third memory element that produces a third configuration bit; and
a fourth multiplexer that receives the third configuration bit from the third memory element, the third multiplexer output signal from the third multiplexer, and the stored first signal from the first register, and wherein the fourth multiplexer selects between the third multiplexer output signal and the stored first signal based on the third configuration bit.

7. The integrated circuit of claim 1, further comprising:
a delay element that receives the first clock signal and delays the first clock signal by a predetermined time duration to generate the delayed first clock signal.

8. The integrated circuit of claim 1, further comprising:
a third memory element that produces a third configuration bit; and
a logic AND gate that receives the status signal from the comparator and the third configuration bit from the third memory element, wherein the logic AND gate performs a logic AND operation of the status signal and the third configuration bit to produce an output signal.

9. The integrated circuit of claim 1, wherein the first register is implemented in a logic region of a programmable logic device.

10. A method for operating an integrated circuit, the method comprising:
with configuration memory, storing configuration data;
with selection circuitry, receiving first and second signals and selecting between the first and second signals based on the configuration data to produce a selected signal;
with a first register, storing the first signal based on a first clock signal;
with delay circuitry, generating a second clock signal by delaying the first clock signal;
with additional selection circuitry, selecting between the first clock signal and second clock signal based on the configuration data to produce a selected clock signal;
with a second register, storing the selected signal based on the selected clock signal; and
with control circuitry, determining whether the stored first signal is different from the stored selected signal.

11. The method of claim 10, wherein the first clock signal has a first clock rate and wherein the second clock signal has a second clock rate that is the same as the first clock rate.

12. The method of claim 10, further comprising:
with configurable interconnect circuitry, routing the stored first signal to an output.

13. The method of claim 12, further comprising:
in response to determining that the stored first signal is different from the stored selected signal, routing the stored selected signal to the output.

14. The method of claim 10, further comprising:
with configurable interconnect circuitry, routing the stored selected signal to an output.

15. The method of claim 14, further comprising:
in response to determining that the stored first signal is different from the stored selected signal, generating a status signal; and
with configurable interconnect circuitry, routing the status signal to the output.

16. The method of claim 10, further comprising:
in response to determining that the stored first signal is different from the stored selected signal, routing the stored selected signal to the first register.

17. The method of claim 10, further comprising:
with a bit stream, providing the configuration data to the configuration memory.

18. A method for operating register circuitry in a programmable logic region, the method comprising:
with a first register in the programmable logic region, receiving and storing a data signal at based on a clock signal;
with a delay circuit, producing a delayed clock signal based on the clock signal;
with a multiplexer, selecting between the data signal and an additional data signal to produce a selected data signal;
with a second register in the programmable logic region, receiving the selected data signal from the multiplexer and storing the selected data signal based on a selected one of the clock signal and the delayed clock signal;
with a comparator in the programmable logic region, receiving the stored data signal from the first register at a first input and the stored selected data signal from the second register at a second input;
with the comparator, producing a status signal based on a comparison of the stored data signal and the stored selected data signal.

19. The method of claim 1, further comprising:
with a second multiplexer, receiving the stored selected data signal from the second register, the status signal from the comparator, and a predetermined configuration bit from a memory element; and
selecting between the stored selected data signal from the second register and the status signal from the comparator based on the predetermined configuration bit.

20. The method of claim 18, the method further comprising:
with the multiplexer, receiving the data signal, the additional data signal, and a predetermined configuration bit from a memory element, wherein the multiplexer produces the selected data signal based on the predetermined configuration bit.

21. The method of claim 20, wherein an additional multiplexer is coupled to the second register and wherein the predetermined configuration bit is a first predetermined configuration bit, the method further comprising:
 with the additional multiplexer, receiving the clock signal, the additional delayed clock signal, and a second predetermined configuration bit from a memory element; and
 with the additional multiplexer, selecting between the clock signal and the delayed clock signal based on the second predetermined configuration bit.

* * * * *